May 29, 1951  G. PREZIOSO  2,554,754

TYPEWRITER RATCHET WHEEL COUPLING

Filed June 8, 1949

INVENTOR
*Giuseppe Prezioso.*

BY
ATTORNEY

UNITED STATES PATENT OFFICE 2,554,754

TYPEWRITER RATCHET WHEEL COUPLING

Giuseppe Prezioso, Yverdon, Switzerland, assignor to Paillard S. A., Sainte-Croix (Vaud), Switzerland, a corporation of Switzerland Application June 8, 1949, Serial No. 97,817
In Switzerland January 11, 1949

4 Claims. (Cl. 197—123)

The present invention relates to a coupling arrangement between the cylinder (platen) of a typewriter and the line-spacing ratchet wheel and comprises an arrangement which is particularly simple when compared with known constructions.

In the arrangement of the invention, the cylinder knob, which can be axially displaced, is connected to one part of a cone coupling or clutch, the other part of which is secured to the line-spacing ratchet wheel. This connection is effected by at least two pins adapted to slide in openings of a member which is secured to the end of the cylinder axle.

The accompanying drawing shows, by way of example, one form of device for carrying the invention into effect.

Figure 1:
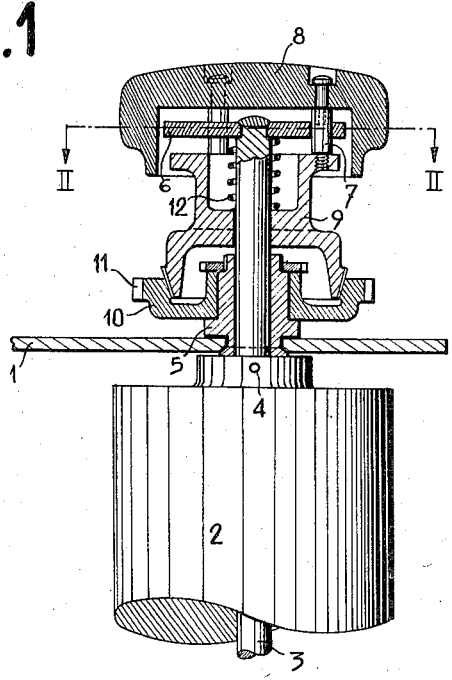
Fig. 1 is a longitudinal cross section of the device.
Figure 2:
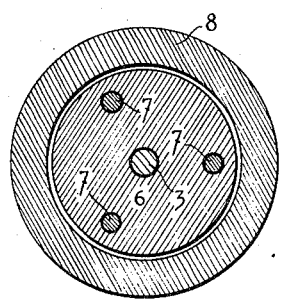
Fig. 2 is a transverse cross section along line II—II of Fig. 1.

With reference to the drawing, the numeral 1 designates a part of the carriage of a typewriter; 2, the cylinder and 3, the cylinder axle. Cylinder 2 and its axle are secured to each other by pin 4. On part 1 of the carriage is mounted a bearing 5 in which axle 3 rotates. The axle carries, screwed to its end, a disk 6 perforated by three equidistant openings, in which openings pins 7 slide. Each pin, at one end, is secured to the cylinder knob 8 and, at the other end, to the male member 9 of a cone clutch. The male member 9 turns and slides freely on axle 3 and is normally in engagement with the female member 10 of the clutch, into the periphery of which line-spacing teeth 11 are cut.

The female member 10 rotates freely on a shoulder of bearing 5.

A coil spring 12 bearing against disk 6 and male member 9 of the clutch, respectively, normally keeps the two members 9 and 10 in engagement.

In the position shown in Fig. 1, the spacing ratchet wheel 11, secured to female member 10, is in engagement with the male member 9 and cylinder 2 can occupy only successive positions which correspond to the spacing of the teeth of the line-spacing ratchet wheel 11 which is acted upon by the line-spacing pawl.

To be able to turn cylinder 2 freely without its stopping position being affected by the teeth of ratchet wheel 11, it is only necessary to displace knob 8 axially outward, against the action of spring 12.

The members 9 and 10 of the clutch are then disengaged and by means of pins 7 which act as connecting members between knob 8 and disk 6, which is secured to axle 3, the cylinder can be rotated to any desired position.

The conical surfaces of the two members 9 and 10 may be provided with very fine lateral ribs on their engaging surfaces so as to prevent relative angular displacements between them when they are in mutual engagement, without the necessity of providing a very strong spring 12.

The male part 9 of the clutch may consist of a single piece or of two pieces (as indicated on the drawing by a dashed line) secured together through welding or by means of rivets, for example.

I claim:

1. In a typewriter, a cylinder platen, an axle on which the platen is mounted, said axle having an extended portion, and a line spacing ratchet wheel, a device normally connecting the ratchet wheel with the platen, including a coupling comprising a friction clutch having two separable members on said extended portion, one of said members being connected to the ratchet wheel and the other member being axially slidable on said extended portion, a disk secured to the end of said extended portion, a spring between said disk and said slidable member normally to urge the latter into engagement with the first member, pins slidably disposed through said disk, one end of each pin being secured to the said slidable member, and a knob secured to the other end of the pins.

2. In a typewriter, a platen, an axle carried by and projecting from one end of the platen, a ratchet wheel mounted coaxially with the axle and rotatable relative thereto, a clutch face on the ratchet wheel, a shiftable clutch member slidably mounted on the axle and having a portion engaging said clutch face on the ratchet wheel, a disk fastened to the end of the axle and having openings, a spring on the axle confined between the shiftable clutch member and the disk normally to urge said member into engagement with the clutch face on the ratchet wheel, pins carried by the shiftable clutch member and fitted in said openings of the disk, and a knob secured to the outer ends of said pins, said knob when manually pulled axially outward of the axle compressing said spring and moving the shiftable clutch member to disengage the same from the clutch face on the ratchet wheel and enabling the operator to turn the platen through the pins and disk independently of the ratchet wheel.

3. In a typewriter, a platen, an axle carried by and projecting from one end of the platen, a bushing in which the axle is mounted, a ratchet wheel rotatably mounted on said bushing, a clutch face on the ratchet wheel, a shiftable clutch member including a body having an opening to receive the axle whereby said member is rotatable and slidable relative to said axle, said member having a spring receiving socket, a clutch face on said shiftable clutch member normally engaging the clutch face on the ratchet wheel, a disk having openings fastened to the axle, a spring confined between the disk and the bottom of said spring receiving socket of the shiftable clutch member, pins carried by the shiftable clutch member for sliding movement in the openings of said disk, and a knob secured to the outer ends of said pins whereby when the knob is manually pulled axially outward of the axle the clutch face of the shiftable clutch member will be disengaged from the mating clutch face on the ratchet wheel and the axle may be turned through said pins and disk independently of the ratchet wheel.

4. In a typewriter, a platen, an axle carried by and projecting from one end of the platen, a disk at the end of the axle and having an opening, a ratchet wheel mounted coaxially with the axle and a coupling device comprising a clutch face on the ratchet wheel and a shiftable clutch member slidable on the axle, spring means confined between one side of the disk and the shiftable clutch member normally urging the latter toward the clutch face on the ratchet wheel, a pin carried by the shiftable clutch member and slidable in said opening of the disk, and a knob connected to said pin, whereby, when the knob is manually pulled axially outward of the platen, the shiftable clutch member will be disengaged from the clutch face on the ratchet wheel.

GIUSEPPE PREZIOSO.

REFERENCES CITED

The following references are of record in the file of this patent:

UNITED STATES PATENTS

| Number | Name | Date |
|---|---|---|
| 855,532 | Ruger, Jr. | June 4, 1907 |
| 971,032 | Forbes et al. | Sept. 27, 1910 |